Patented Dec. 12, 1922.

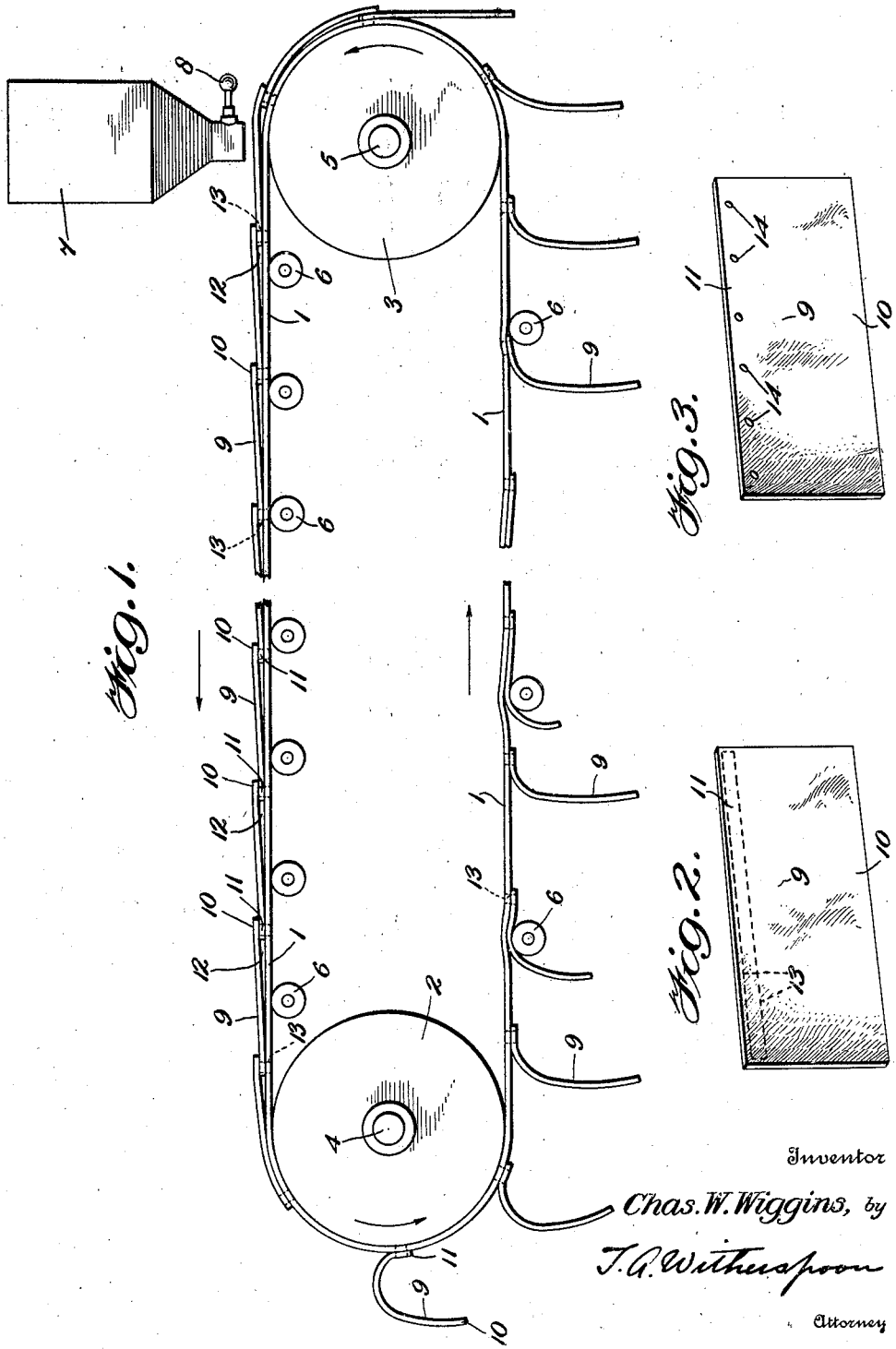

1,438,566

UNITED STATES PATENT OFFICE.

CHARLES W. WIGGINS, OF BREWSTER, FLORIDA.

CONVEYER BELT.

Application filed June 28, 1921. Serial No. 481,020.

*To all whom it may concern:*

Be it known that I, CHARLES W. WIGGINS, a citizen of the United States, residing at Brewster, in the county of Polk and State of Florida, have invented certain new and useful Improvements in Conveyer Belts; and I do hereby declare the following to be a full, clear, and exact description of the invention, such as will enable others skilled in the art to which it appertains to make and use the same.

This invention relates to belts for conveying materials and has for its object to provide a device of this character which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

In order that my invention may be more clearly understood, it is said: In the past various materials have been conveyed from point to point in manufacturing plants by means of endless belts, which are operated in the usual manner by means of a driving pulley and are supported throughout their length upon idlers. The material to be conveyed is discharged upon the belt and, resting upon its surface, is conveyed to the desired point and then discharged.

Belts of this type are usually manufactured from a suitable fabric, as canvas or similar materials, which fabrics while possessing mechanical strength are not particularly resistant to abrasion, corrosion, or high temperature. For the purpose of protecting the fabric, they are sometimes coated or impregnated, or both, with rubber or other suitable compounds, but these coatings under many service conditions deteriorate more or less rapidly and expose the underlying fabric to the deleterious action of the material being handled.

For example, products from dryers are discharged on the belts at high temperatures, and rest thereon for a given conveying period. When such products are abrasive materials, such as sharp sand, they cut the fabric, while if they are of an adhesive character they stick to the belt and exert cutting action as the belt travels over the idlers on its return flight.

Conveying belts are frequently of great length and the period of exposure to the hot, abrasive or corrosive materials may be greatly prolonged. As a result these belts suffer materially and soon deteriorate to such a point that they break, which occasions interruption in service, expensive repairs and a rapid discard of the whole conveying apparatus.

One of the purposes of the present invention, therefore, is to cheaply and easily construct a conveying belt more especially adapted for severe conveying service and one which will have a greatly increased life over the simple coated fabric so generally in use. The novel features of this construction do not in any way affect the mechanical strength of the belts, but on the other hand, they provide for a ready and rapid replacement of the parts subjected to excessive deterioration, which may be economically renewed when worn out.

In constructing conveyer belts in accordance with the present invention, I use as a foundation a belt of the ordinary type, for example, one having a fabric base treated or impregnated with a protective compound. This belt is supported in the usual manner by means of idler pulleys and driven by means of the usual driving pulley. For protecting the wearing surface of this belt, I fasten to the outer surface of the same, flaps or plates of flexible material, which may be of the same material as the main driving belt, or of any other suitable material. One edge of these flexible flaps or plates is secured in any desired manner to the said belt, substantially at right angles to its direction of travel and the said flaps are of such dimensions that the opposite edge overlaps the fastening of the next succeeding wearing member.

This construction will be clearly understood by referring to the accompanying drawings, forming a part of this specification, in which—

Figure 1 is a diagrammatic side elevational view of a conveyer employing a belt made in accordance with the present invention;

Figure 2 is a diagrammatic perspective view of one of the protecting flaps or plates, illustrating one method of securing it to the belt; and Figure 3 is a view similar to Figure 2, showing another method of securing the flaps to the belt.

1 indicates a conveyer belt of any suitable material, depending upon the use to which it is to be put, which belt may pass around the usual driving and supporting pulleys 2 and 3, mounted upon the shafts 4 and 5. The said belt may be supported intermediate the pulleys 2 and 3 by the idler pulleys 6, and a hopper 7 controlled by a valve 8 is adapted to feed the material being handled to the belt.

Secured to the belt 1 at suitable intervals are the wearing flaps or members 9, which are preferably of such dimensions that one edge portion 10 thereof overlaps the edge portion 11, of the adjacent flap, thereby preventing the material which is being handled from working in to the belt 1, as would be the case if a flush or butt joint were employed. The present overlapping or fish scale construction is also advantageous when handling heated materials, for the flaps 9 are each slightly inclined, forming air spaces 12 as shown, between them and the belt 1, which tend to keep the latter cool, and protect it from the injurious effects of the heat.

The members 9 are preferably made of a width substantially equal to the width of the belt 1, and one edge portion 11 of each flap is secured to the said belt transversely thereof, as by the stitching 13, illustrated in Figure 2, or rivets passing through the holes 14 shown in Figure 3, or in any other suitable manner.

The said members 9 may be composed of the same materials as the belt 1, or of such other materials as are best suited to resist the injurious and deteriorating properties of the material being handled. In actual practice, I have frequently formed them from old worn out belts, with excellent results.

As the belt carrying the material passes over the driving pulley 2, it discharges its load, which discharge is assisted by the hinged action of the flaps 9. These protecting members bend outward by their own weight and as they progress further around the pulley, open up from the supporting belt and discharge any material which by accident had gotten between it and the said members, which at the same time are exposed on all sides to the cooling action of the air through which they pass. Upon the return flight, the wearing strips pass over the idlers and again flap down to a more or less vertical position, in that way insuring complete discharge of all material, even when somewhat adhesive, and also of all material which by accident had gotten under the said strips. As the wearing strips pass around the tension pulley 3 they again drop back into the overlapping fish scale form, and take up a new load of raw material coming from hopper 7.

It will thus be seen that I have provided a conveyer belt which is especially adapted for carrying adhesive or abrasive material, either in the hot or cold state, in that it has its carrying surface protected from the cutting and deteriorating action of such materials by the protecting flaps 9. It will further be clear that these said flaps will take substantially all of the wear off of the belt 1, and when they themselves wear out, they may be readily and cheaply replaced in a comparatively short time, thus eliminating in a large measure the time now lost through shut downs for repairs to, or substitution of, conveyer belts.

It is obvious that those skilled in the art may vary the details of construction as well as the arrangement of parts without departing from the spirit of the invention, and therefore, I do not wish to be limited to the above disclosure except as may be required by the claims.

What I claim is:

1. In a conveyer the combination of an endless belt of flexible material; a pair of supporting pulleys around which said belt passes; a plurality of idler pulleys under the upper and lower runs of said belt and located between said supporting pulleys; a plurality of wear and heat resisting flaps made of flexible material overlapping each other at their ends and covering the entire outer surface of said belt when in their flat condition, each flap being secured at its forwardly traveling end to said belt and having its other and rearwardly extending overlapping end raised from the surface of said belt to form an air space, substantially as described.

2. In a conveyer the combination of an endless belt of flexible material; a pair of supporting pulleys around which said belt passes; an idler pulley for supporting said belt located beneath the upper run of said belt and between said supporting pulleys; a plurality of wear and heat resisting flaps made of flexible material overlapping each other at their ends and covering the entire outer surface of said belt when in their flat condition, each flap being secured at its forwardly traveling end to said belt and adapted to turn away from said belt to discharge its load at the end of its forward travel; each flap also having its other and rearwardly extending overlapping end raised from the surface of said belt to form an air space and adapted to pass over said idler pulley on its return flight, substantially as described.

3. In a conveyer the combination of an endless belt of flexible material; a pair of supporting pulleys around which said belt passes; an idler pulley for supporting said belt located beneath each of the upper and lower runs of said belt and between said supporting pulleys; a plurality of wear and heat resisting flaps made of the same flexible material as said belt, said flaps overlapping each other at their ends and covering the entire outer surface of said belt when in their flat condition, and each flap being secured at its forwardly traveling end to said belt and having its other and rearwardly extending, overlapping end raised from the surface of said belt to form an air space, substantially as described.

In testimony whereof I affix my signature.

CHARLES W. WIGGINS.